United States Patent
Woodell et al.

(10) Patent No.: US 7,486,219 B1
(45) Date of Patent: Feb. 3, 2009

(54) ADAPTIVE WEATHER RADAR DETECTION SYSTEM AND METHOD

(75) Inventors: Daniel L. Woodell, Cedar Rapids, IA (US); Roy E. Robertson, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 11/402,434

(22) Filed: Apr. 12, 2006

Related U.S. Application Data (63) Continuation-in-part of application No. 11/256,845, filed on Oct. 24, 2005, which is a continuation of application No. 10/631,253, filed on Jul. 31, 2003, now Pat. No. 7,129,885.

(51) Int. Cl.
G01S 13/95 (2006.01)
G01S 7/04 (2006.01)
G01S 13/00 (2006.01)

(52) U.S. Cl. .............. 342/26 B; 342/26 R; 342/73; 342/74; 342/75; 342/89; 342/91; 342/159; 342/175; 342/176; 342/195; 342/357.01; 342/357.06

(58) Field of Classification Search ...... 342/26 R–26 D, 342/89–103, 165–175, 357.01–357.17, 73–81, 342/159–164, 176–186, 192–197
See application file for complete search history.

(56) References Cited

U.S. PATENT DOCUMENTS

| | | | |
|---|---|---|---|
| 3,964,064 A | 6/1976 | Brandao et al. | |
| 4,283,725 A * | 8/1981 | Chisholm | 342/26 B |
| 4,435,707 A | 3/1984 | Clark | |
| 4,555,703 A | 11/1985 | Cantrell | |
| 4,613,938 A | 9/1986 | Hansen et al. | |
| 5,198,819 A | 3/1993 | Susnjara | |
| 5,311,184 A | 5/1994 | Kuntman | |
| 5,945,926 A | 8/1999 | Ammar et al. | |
| 6,081,220 A * | 6/2000 | Fujisaka et al. | 342/26 D |
| 6,177,873 B1 | 1/2001 | Cragun | |
| 6,240,369 B1 | 5/2001 | Foust | |
| 6,388,608 B1 | 5/2002 | Woodell et al. | |
| 6,424,288 B1 | 7/2002 | Woodell | |
| 6,597,305 B2 | 7/2003 | Szeto et al. | |
| 6,603,425 B1 | 8/2003 | Woodell | |

(Continued)

FOREIGN PATENT DOCUMENTS

FR      2 658 617 A1      8/1991

(Continued)

OTHER PUBLICATIONS

"Corridor Integrated Weather System (CIWS)"; no author listed; no date listed; posted on the Internet at www.ll.mit.edu.*

(Continued)

Primary Examiner—Bernarr E Gregory (57) ABSTRACT

A method of detecting weather on an aircraft uses a weather radar system. The method adapts the weather radar system in accordance with a seasonal parameter, a time-of-day parameter, or a location parameter. The method includes determining the particular parameter and automatically adjusting the weather radar system to display the weather in response to the parameter. The system can be implemented in hardware or software and advantageously can more precisely predict and identify weather and/or weather hazards.

22 Claims, 5 Drawing Sheets

U.S. PATENT DOCUMENTS

| | | |
|---|---|---|
| 6,650,275 B1 | 11/2003 | Kelly et al. |
| 6,667,710 B2 | 12/2003 | Cornell et al. |
| 6,670,908 B2 | 12/2003 | Wilson et al. |
| 6,677,886 B1 | 1/2004 | Lok |
| 6,741,203 B1 | 5/2004 | Woodell |
| 6,879,280 B1 * | 4/2005 | Bull et al. .................. 342/26 B |

FOREIGN PATENT DOCUMENTS

WO    WO98/07047 A1 *  2/1998

OTHER PUBLICATIONS

"Description of Corridor Integrated Weather System (CIWS) Weather Products"; no author listed; Jun. 2001; Federal Aviation Administration, CIWS Program Office; Washington, DC.*

W.J. Dupree et al., "FAA Tactical Weather Forecasting in the United States National Airspace"; no date given; MIT Lincoln Laboratory; Lexington, Massachusetts, USA.*

"The Vertical Profile of Radar Reflectivity and Convective Cells: A Strong Indicator of Storm Intensity and Lightning Probability?" E. Zipser and K. Lutz; America Meteorological Society, 1994, pp. 1751-1759.

* cited by examiner

ADAPTIVE WEATHER RADAR DETECTION SYSTEM AND METHOD

CROSS-REFERENCE TO RELATED APPLICATIONS

This application is a continuation-in-part of and claims priority to U.S. patent application Ser. No. 11/256,845 filed Oct. 24, 2005, which is a continuation of U.S. patent application Ser. No. 10/631,253, filed Jul. 31, 2003, now U.S. Pat. No. 7,129,885. U.S. application Ser. Nos. 11/256,845 and 10/631,253 are herein incorporated by reference.

BACKGROUND OF THE INVENTION

Conventionally, pilots use weather radar to detect and avoid hazardous weather. Conventional radar systems may produce the desired results only in a limited environment. Typically, airborne threshold systems use thresholds for wet precipitation derived from ground-based weather radar thresholds generated from convective weather. Such thresholds have been set in accordance with reflectivity data which is applicable to typical convective weather systems in continental environments but not necessarily in maritime regions. It has been observed that maritime storm reflectivity differs substantially from continental storm reflectivity. Research by Zipser and Lutz in "The Vertical Profile of Radar Reflectivity of Convective Cells: A Strong Indicator of Storm Intensity and Lightning Probability?", Monthly Weather Review of the American Meteorological Society, 1751-1759 (August 1994), characterizes the differences in reflectivity of continental versus maritime convective storms. Below the freezing altitude, the research shows that maritime storm reflectivity averages 8 dB below that of continental storms with peak maritime reflectivities observed at near sea level while peak continental reflectivities are observed at about the 8000 foot region. Above the freezing altitude, the reflectivity of maritime cells falls off at an average rate of 1.4 dB per 1000 feet versus the falloff rate of 0.45 dB per 1000 feet for continental storms. Peak reflectivity differences between the two populations of cells peak at about the 23 dB range at about 28,000 feet.

Conventionally, radar thresholds map radar return strength to a display with color representing rain rate or alternatively a weather threat assessment level. The threat level has been previously described as primarily a function of radar reflectivity and a weaker function of temperature, altitude, and latitude. However, because of the difference in maritime and continental weather, the conventional mapping while useful, does not completely allow successful operation of aircraft in maritime regions. The lower reflectivity of maritime weather does not allow for successful detection of significant convective weather systems during flight. Further, because of the ability of aircraft flying over maritime regions to circumnavigate storm systems, if recognized, it would therefore be desirable to provide an airborne radar system which has the ability to more accurately detect and report the existence and/or characteristics of maritime storms when operating in maritime environments and continental storms when operating in continental environments. It may be possible for a pilot operating radar manually to be able to compensate for the differences in maritime and continental weather as each pilot becomes familiar with the environment. However, knowledge by the pilot must be acquired, and further, an increase in pilot workload is also necessitated. Therefore, there is a need for an automated system of adjusting radar thresholds based on the presence of maritime or continental weather environments.

In addition, weather can vary within certain geographic regions. For example certain regions above the ocean and certain regions above land masses can have weather systems whose characteristics differ from other regions above the same ocean or land mass. Accordingly, it would be desirous to provide a radar system which can compensate radar detection in accordance with known characteristics of certain regions above oceans and land masses. In addition, weather characteristics can change according to seasonal and time-of-day variations. For example, certain radar reflectivities occurring during the monsoon season may indicate hazardous weather while those same radar reflectivities would indicate non-hazardous during another season. Similarly, weather radar returns at a certain time-of-day are more likely to indicate the presence of hazardous weather (e.g., afternoon) while those same returns are less likely to indicate the presence of a hazard at another time-of-day (e.g. early morning).

Often, the reflectivity of maritime weather systems may be lower than that which may be detected with the conventionally used on-board radar hardware. Accordingly, there is a need for an automated system that adjusts radar tilt lower to improve detectability of weather systems in those maritime environments that are characterized by low reflectivity aloft and higher surface layer reflectivitiy. There is also a need to adjust weather radar detection schemes based upon a specific geographic location, time-of-day, and/or season. There is further a need to adjust weather radar systems by adjusting display thresholds, tile angle, and/or system gain. Yet further, there is a need for a weather radar system that automatically adjusts to location time-of-day, and/or time-of-year.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

An exemplary embodiment relates to a method of detecting weather on an aircraft using a weather radar system. The method includes determining a location of the aircraft, retrieving weather radar information associated with the location and automatically adjusting the weather radar system in response to the information.

Another exemplary embodiment relates to a method of adapting an aircraft weather radar system to a seasonal parameter, a time-of-day parameter, or a location parameter. The method includes determining the seasonal parameter, the time-of-day parameter, or the location parameter. The method also includes automatically adjusting the weather radar system to display weather in response to at least one of the seasonal parameter, time-of-day parameter, or location parameter.

Still another exemplary embodiment relates to an airborne weather radar system carried on an aircraft. The airborne weather radar system includes a radar antenna system and a processing means for adjusting performance of the weather radar system. The processing means adjusts performance of the weather radar system based on at least one of a location of the aircraft, a time-of-day, or a time-of-year.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In conventional continental aircraft systems, air carriers wish to detect threatening weather which may be a threat to the aircraft or passengers. However, in maritime environments, the air carriers attempt to identify weather which may be much milder since maritime carriers have many more available miles to fly, thus they may be able to circumvent any mild weather systems in the maritime environments in an attempt to provide increased passenger comfort.

Continental weather is driven by the low heat capacity of the ground providing exceptional localized heating. In the maritime environment, however, the ocean or other water acts as a modulator of the heat. The water has a high energy capacity and thus there is typically no strong localized convective regions. Further, in some maritime weather systems without heavy localized convection, the clouds may still be very tall, but there may not be a lot of energy in the cloud system. An example of this case is weather at the inter-tropical convergence zone that is characterized by large scale Hadley Cycle uplift that produces clouds to substantial altitudes even when substantial localized convection is not present. This is quite contrary from the continental weather environment where weather height is used by pilots as an indicator of hazard.

The higher in the atmosphere the cloud system of continental weather, the more hazardous the weather system is because it generally requires more energy to cause clouds to reach such an altitude. In maritime weather, the clouds basically rain out at very low altitude because of the limited updraft velocities produced by the very limited localized convection over the temperature moderating water. Thus, by the time the cloud in a maritime environment, even though it may be tall, gets to the altitude of a cruising airplane, there is very little precipitation for the airborne radar to detect. For example, between 35,000 and 36,000 feet, there is approximately 20 or 30 dB difference between the amount of radar return at mid-continental latitudes versus equatorial maritime systems. Thus, for the mid-latitude continental case, the thunderstorm may be very detectable, however, it may be well below the detectability capability of a weather radar in an equatorial maritime environment. Accordingly, an airborne radar system may be used to identify locations for the changing of radar thresholds in continental, maritime, or transitional regions, among other possibilities.

In addition, regions within continental, maritime, and transitional locations may have specific weather characteristics that require the weather radar system to be adjusted in order to more precisely sense and identify particular types of weather. The adjustments can be made in a variety of fashions including adjusting the tilt of the weather radar antenna, adjusting display thresholds associated with the radar system, or adjusting the gain associated with the transmitted or received signals of the weather radar system. Further, according to another embodiment, the adjustments can be made in accordance with a time-of-day parameter and/or a season parameter. Such parameters may be combined with location parameters to define adjustments that may be made to the weather radar system. For example, Applicants have found that particular regions in maritime environments have weather characteristics that change according to particular location, time-of-day, and seasons. For example, weather that is highly precipative at a particular time-of-day, in a particular season, or at a particular location in a maritime environment may be indicated as less precipative according to normal display thresholds, tilt angles, and gain parameters.

Figure 1:
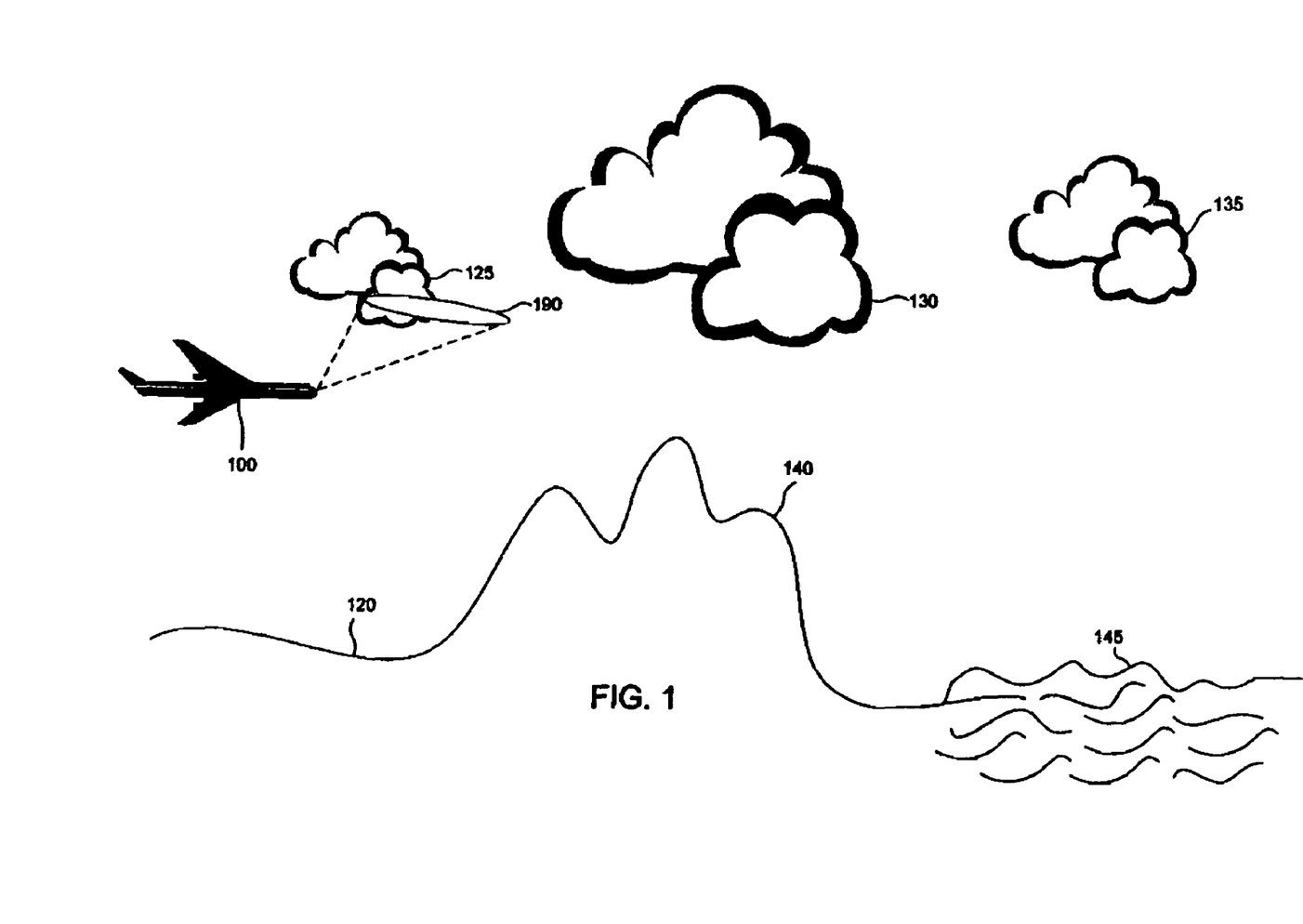
FIG. 1 is an exemplary diagram of an airplane having a weather radar system and flying in the atmosphere.

Referring to FIG. 1, an aircraft 100 is depicted having a radar on-board capable of casting a radar beam 190 and receiving reflective energy from weather systems 125, 130, 135 and the like. Weather system 125 may be representative of a continental weather system. Weather system 130 may be representative of a continental convective weather system and weather system 135 may be representative of a maritime weather system which is over a maritime environment 145. Convective weather system 130 may be over a mountainous terrain 140, for example, and weather system 125 may be over a plain-like environment 120.

Figure 2:
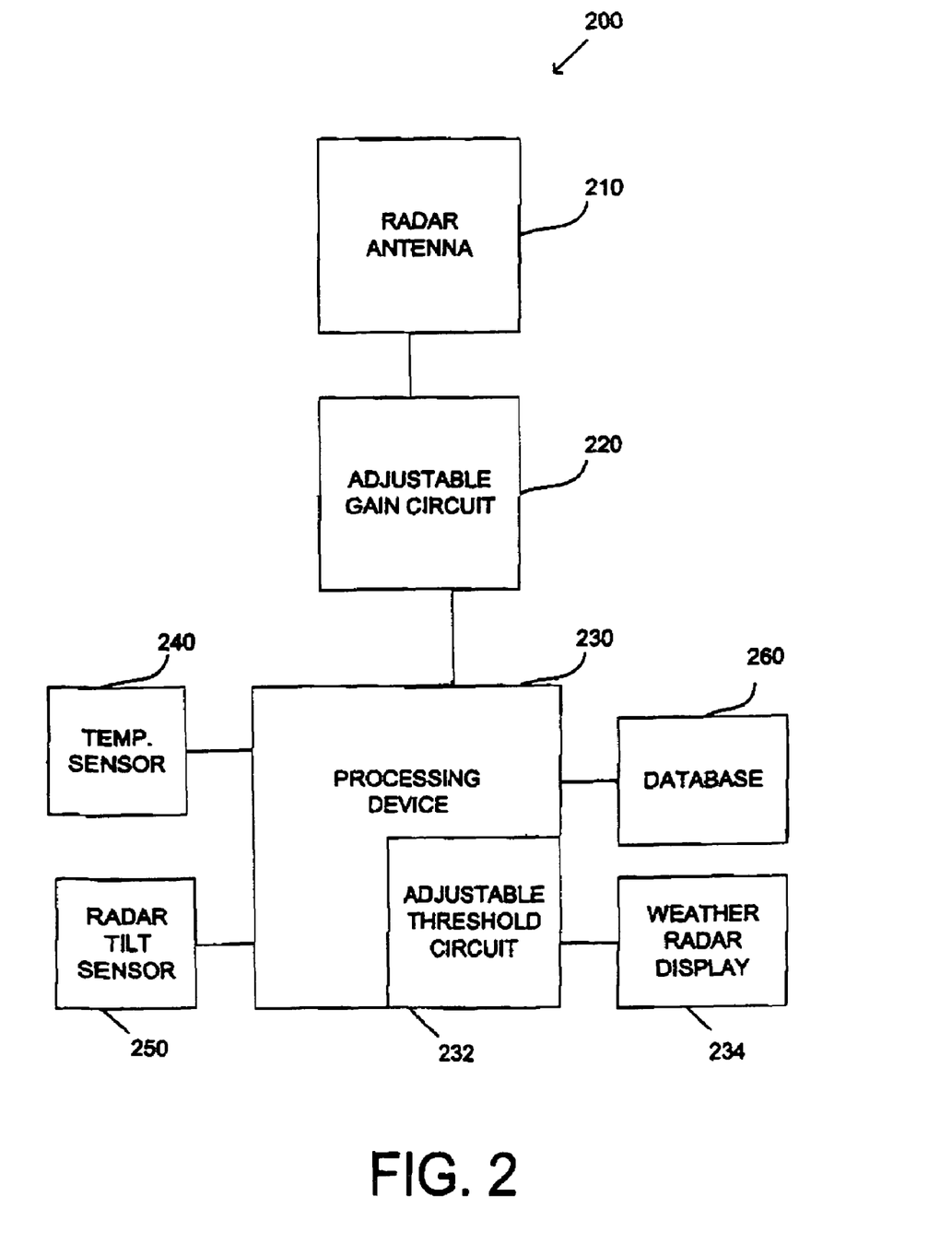
FIG. 2 is an exemplary block diagram of a radar system having an adjustable threshold circuit.

Referring now to FIG. 2, a radar system 200 includes a radar antenna 210 for sending and receiving radar signals. System 205 also includes an adjustable gain circuit 220 that is configured to change the gain of the radar signal provided to radar antenna 210. Processing device 230 receives temperature data from a temperature sensor 240 and radar tilt sensor 250. In an exemplary embodiment, processing device 230 also accesses a database 260 which contains information relating to the type of weather, including but not limited to continental weather, maritime weather, or transitional weather based on the location of the aircraft. Processing device 230 may also be configured with instructions which calculate and/or determine an appropriate adjustable threshold command via a control law which is based on the type of weather being observed. The adjustable threshold command is to be communicated to an adjustable threshold circuit 232 based on data supplied to processing circuit 230 such as but not limited to the weather type, temperature inputs, and the radar beam direction. Further, other information such as latitude, longitude, location, time-of-day, time-of-year, etc. may also be used to make the gain adjustment. Database 260 may be used to describe whether a specific location (i.e., latitude, longitude) is either a maritime or continental location. The database may be generated from a table of altitudes versus latitude/longitude. Also, sea level locations may represent maritime locations. Above sea level locations may be considered continental locations. Further, the generated database may be used to identify and remove ground clutter targets. For example, in continental environments, the entire sample field may be clutter, like for some antenna geometries. In this case, some terrain features may produce various radar returns. For situations where these terrain features produce radar returns, the database may be used as a source of clutter threshold information, to reduce terrain returns from the weather radar display. In maritime environments, small to large land masses may be embedded in what would otherwise be a maritimelike sample space. In this case, the clutter database may be used to reduce or remove radar returns from those land targets.

A threshold control law used in adjustable threshold circuit 232 may be based on whether the weather being displayed on display 234 is located in the continental, maritime, or transitional regions which is derived from information stored in database 260. The thresholds may be adjusted according to the weather type using adjustable threshold circuit 232, and thereby display, on display 234, the appropriate weather-hazard alert or condition. Other types of alerts may also be used and be based on the adjustable thresholds, including but not limited to a visual and aural warnings.

The radar returns may be normalized depending on the environment in which it is detected. This may be used for any type of weather radar that operates in a range of environments. This includes simple auto-tilt radars, manual radars, as well as fully automatic systems which use all possible environmental data including but not limited to the WXR-2100 multiscan radar available from Rockwell Collins of Cedar Rapids, Iowa.

In an alternative embodiment, system 200 may be used to control antenna tilt, gain control on the receive side, gain control on the transmit side as well as thresholds. Often the reflectivity in maritime situations is lower than can be detected with conventional on-board weather radar hardware. However, as antenna tilt is lowered, weather below the aircraft is illuminated. At some point below the aircraft, radar reflectivity rises to the point where weather is detectable. If a range is given at which detection is desired, for example, 120 nautical miles, the weather model given by Zisper or alternative models may be used to compute the amount of down tilt required to produce a detection. This may detect weather that does not extend to the aircraft's altitude, but low altitude weather will drop below the antenna beam and "fall off the display" at approximately the 40 to 80 nautical miles range, for example. The pilot can use the 100 nautical mile plus (or other long range) weather as cautionary while confirming the need to detour when weather does not drop out at shorter ranges.

In another exemplary embodiment, the radar system may be configured to slew smoothly between maritime and continental modes. For situations in which the radar environment is neither fully maritime nor fully continental, the percentage of the scanned area which is maritime verses continental is used to drive the threshold and antenna control logic to intermediate values. These values can be used for the entire sampled area or at each point within the sampled space. In addition, the database which supports this environmental decision process may have bits reserved to support individual maritime/continental decisions. As an example, consider coastal areas which are land, but the typical environmental airflow produces a maritime airmass above this point in space. Thresholds in this area should be maritime. In a similar manner, ocean areas which typically contain continental airmasses above them should have thresholds for them driven from the continental models. Dynamic selection of the nature of a point in space can be computed if the environmental wind flow is known. Points inland with airflow from ocean regions can be identified as ocean-like. Similarly, ocean situations that have their airflow blown in from continental areas may be identified as being continental in nature.

The database may further be used to bias the threshold process, the gain control process, or antenna tilt. Antenna beams which impinge on ground have their effective gain reduced during sampled ranges that have that interaction. This allows island and mountain situations to not be displayed to the pilot and allows increased weather detection characteristics in intervening areas between island, land or mountain areas. The gain reduction system differs from an editing system in that boundary values may be softened to reduce the effects of identification mistakes and still allow weather detection in the area influenced by land, island, or mountain targets.

In a similar manner, the thresholds used in multibeam clutter rejection processes may be modified by using the data base to improve weather detection margins and improve clutter removal robustness. This may allow lower antenna beam angle to interrogate weather while providing clutter rejection for precipitous terrain.

Figure 3:
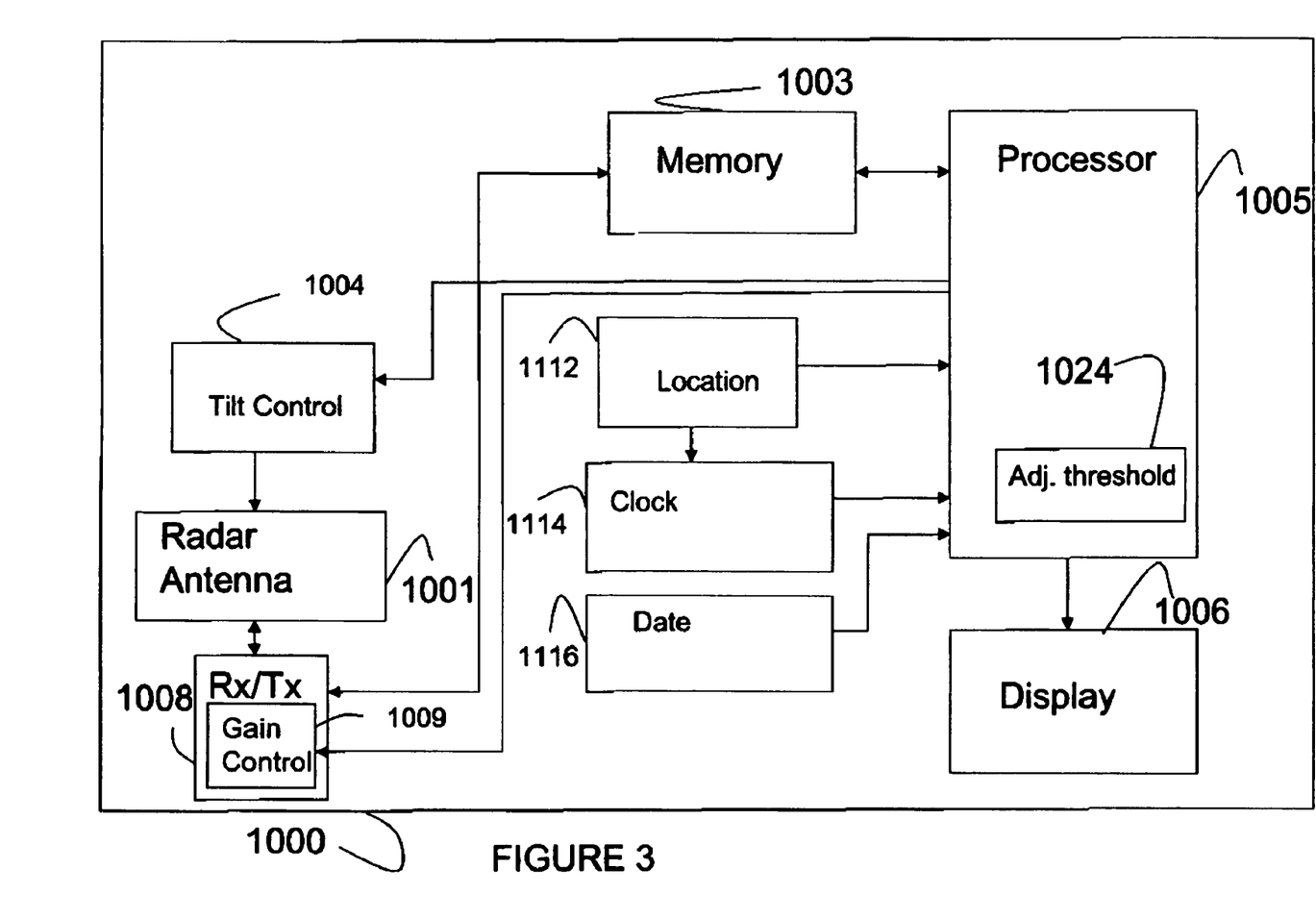
FIG. 3 is another exemplary block diagram of an airborne weather radar system capable of adjusting to time-of-day, season, and/or location.

With reference to FIG. 3, weather radar system 1000 is similar to system 100 described above. System 1000 can utilize any type of base hardware including the hardware associated with conventional weather radar systems manufactured by Rockwell Collins, Inc. and Honeywell International. System 1000 is advantageously configured to automatically adjust to a particular location parameter, time-of-day parameter, and/or season parameter.

The location parameter can provide a precise latitude and longitude, a general area, a distance along a flight plan or other type location indicator. The location parameter can be provided by any type of location sensor including a GPS system. The location parameter can also be provided from an off-airplane source or be derived from flight plans and time-of-flight parameters.

System 1000 preferably includes a tilt control circuit 1004, a radar antenna 1001, a receive transmit circuit 1008, a memory 1003, a location circuit 1112, a clock circuit 1114, a date circuit 1116, a display 1006, and a processor 1005. Processor 1005 can include a display threshold adjustment circuit 1024. Circuit 1024 can operate in accordance with the description provided above. Gain control circuit 1008 can operate on the receive end or the transmit end. Preferably, gain control circuit 1008 operates on the transmit end and is controlled by a signal from processor 1005.

Location circuit 1112 provides a location parameter to processor 1005. In one embodiment, the location parameter can indicate a specific geographic region. Some specific geographic regions that have particular weather characteristics include: the North Atlantic where the nominal antenna elevation reduction would produce overestimation of weather or around dry equatorial Africa where again Hadley cycle uplift produces high clouds but similar to the maritime equatorial environment all substantial reflectivity occurs at low altitudes.

In an alternative embodiment, the location parameter can indicate a specific region having a predetermined area. For example, the location parameter can be any area, but typical examples would be in the range of 100 to 1000 square mile regions. The size and/or borders of regions can change as a function of time-of-day or season.

Clock circuit 1114 provides an indication of time-of-day to processor 1005. Date circuit 1116 provides a time-of-year indication to processor 1005. Although shown as coupled directly to processor 1005, circuits 1112, 1114, and 1116 can be incorporated within processor 1005 and can even be provided wholly or at least partially as a software sub-routine. In addition, circuits 1112, 1114, 1116 can communicate with processor 1005 through memory 1003. Processor 1005 does not need to communicate through memory 1003 and can communicate directly with receive transmit circuit 1009.

Processor 1005 can provide control signals to tilt control circuit 1004 and gain control circuit 1009. System 1000 can be adjusted through processor 1005 to take into account a location parameter from circuit 112, a time-of-day parameter from circuit 114, and a time-of-year parameter from circuit 116. Processor 1005 preferably automatically adjusts at least one of display threshold circuit 1024, tilt control circuit 1004, and gain control circuit 1009. The adjustment preferably makes the sensing of weather regions and their severity more accurate. Gain control circuit 1009 can control the gain associated with the transmit end or the receive end of signals provided to and from antenna 1001.

Antenna controlled elevations and radar gains can also be a function of time-of-year and time-of-day. As an example of time-of-year adjustments, consider the seasonal movements of the ITCZ (Inter-Tropical Convergent Zone). Lines of high altitude clouds with possible embedded thunderstorms follow the ITCZ's seasonal movement that tracks the sun North and South. The latitude of the ITCZ is both a function of the time-of-year and the local latitude/longitude. Radar gains should peak at the latitudes of the ITCZ while antenna tilts will be most depressed for low altitude weather reflectivity at these same latitudes. An example of time-of-day adjustment involves low thunderstorm probability over Africa at early to mid-morning as compared to a very high probability in late afternoon. So even if gain and antenna would be normally positioned for equatorial detection (elevated gain and depressed antenna positions), such detection at early to mid-morning in these low probability periods would likely present an aircraft crew with a false warning. Therefore, the suite of increased gain and depressed antenna control should not be applied at these early morning hours.

Figure 4:
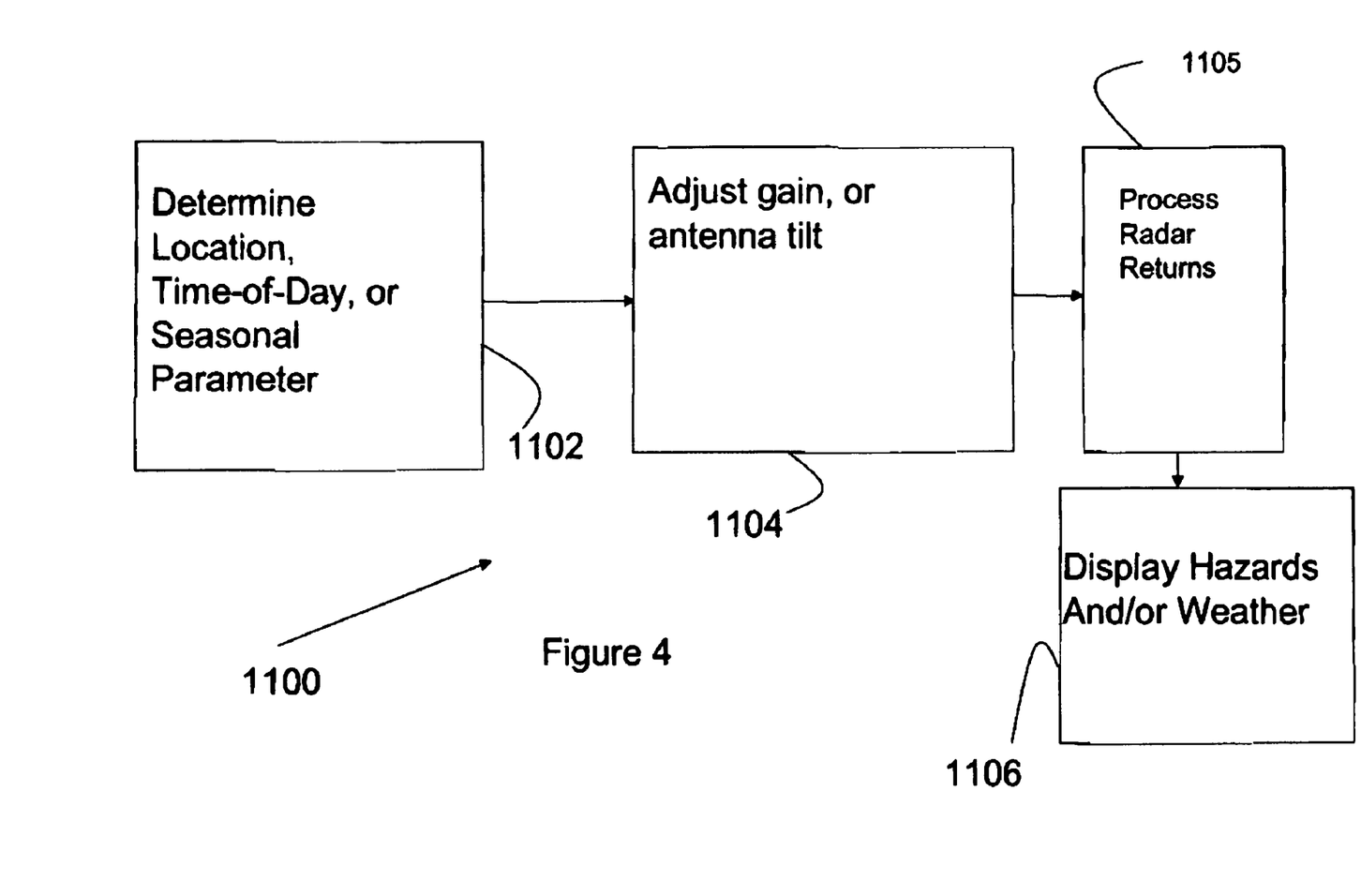
FIG. 4 is a flow diagram of the operation of the airborne weather radar system illustrated in FIG. 3 in accordance with an exemplary embodiment.

With reference to FIG. 4, a flow diagram 1100 shows the operation of circuit 1000. Processor 1005 preferable operates software to implement flow diagram 1100. At a step 1102, a location parameter, time-of-day parameter, and/or seasonal parameter is determined. At a step 1104, the antenna tilt is adjusted in accordance with the parameter or the gain is adjusted in accordance with the parameter. At a step 1105, processor 1005 processes radar returns. At a step 1106, processor 105 provides indications of hazards and/or weather on display 1006.

All commanded gain and antenna elevation values preferably slew from identified space or time regions to the next space or time region. In one embodiment, step functions are preferably not used. Typical antenna elevation laws would include lowering radar sample beams by 0.5 to 2 degree in the fully low reflectivity maritime environment. The antenna beam control can either be commanded by slewing an available beam to the new location or by selecting antenna beams that have already been selected. This could also be mechanized by selecting different altitude memory locations that have been filled from beam positions that have already been commanded and sampled. Complete environments that are not fully maritime would have only a portion of the maritime antenna elevation change commanded. Gain changes on the other hand can occur either over the total environment or on a radar resolution by radar resolution cell basis. The gain modifications increase in the maritime environment may be as much as 16 to 20 dB. Gain changes preferably slew between individual values and are preferably not step function in nature. Maritime and continental antenna control can also be accomplished by beam selection.

Figure 5:
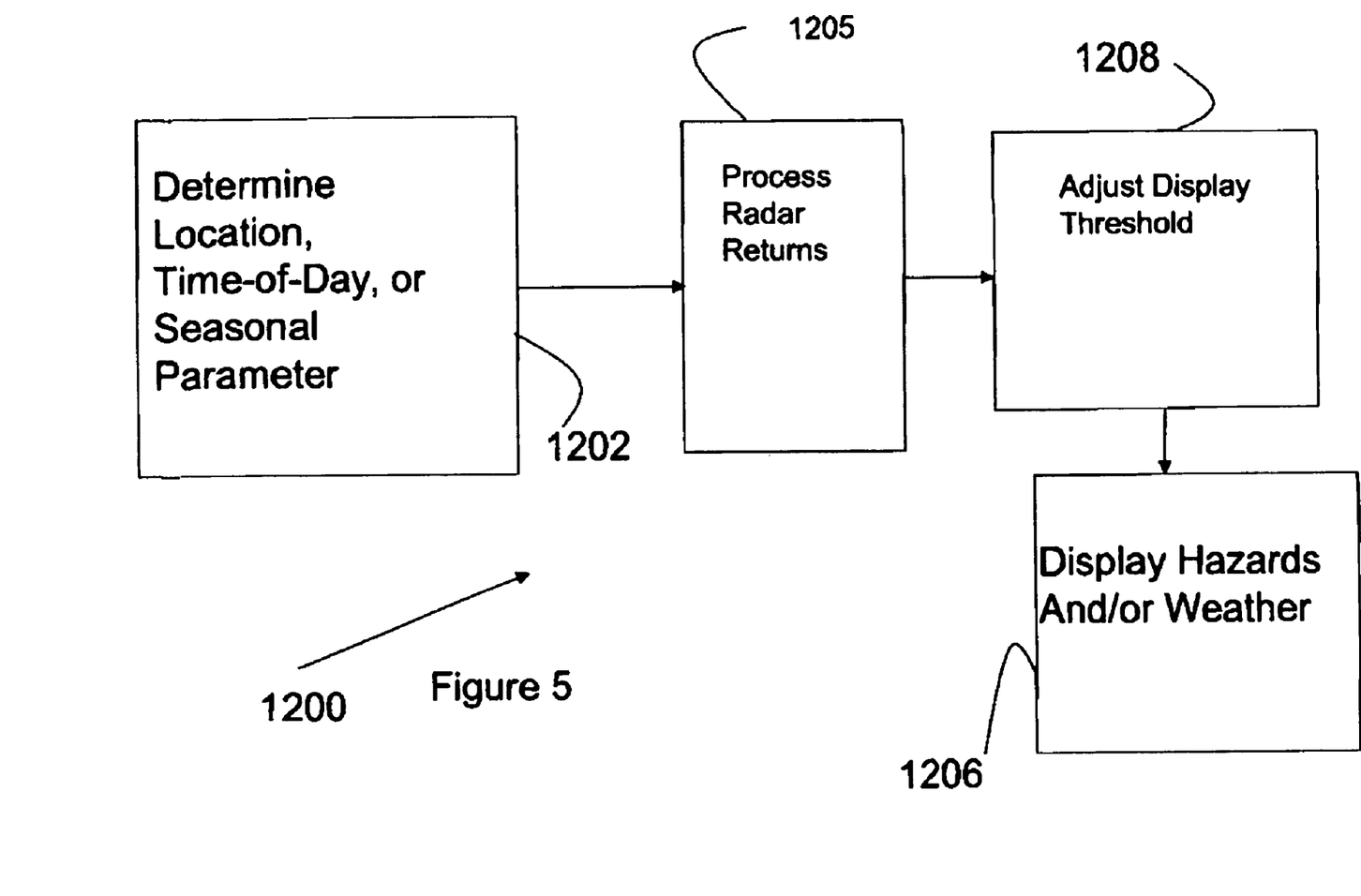
FIG. 5 is a flow diagram of the operation of the airborne weather radar system illustrated in FIG. 3 in accordance with yet another exemplary embodiment.

With reference to FIG. 5, a flow diagram 1200 shows operation of system 1000 in accordance with another embodiment. Processor 1005 preferably operates software to implement flow diagram 1200. At a step 1202, a location parameter, time-of-day parameter, or seasonal parameter is determined. At a step 1205, radar returns are processed in processor 1005. At a step 1208, the threshold associated with the display of hazards or weather is adjusted. At a step 1206, indications of hazards and/or weather are displayed on display 1006. Fractional maritime environments should have thresholds adjusted as a function of there fractional nature. Thresholds may be adjusted on a complete radar sample environment or on a radar resolution cell by radar resolution cell basis. In one embodiment, thresholds preferably slew smoothly from space/time region to space/time region with step changes preferably not being allowed.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of detecting weather for an aircraft using a weather radar system, the method comprising:
   determining a location of the aircraft;
   determining a geographic region or region type associated with the determined location;
   providing weather radar adjustment information previously associated with the geographic region or region type; and
   automatically adjusting the weather radar system in response to the weather radar adjustment information.

2. The method of claim 1, wherein determining a location further comprises:
   receiving global positioning system (GPS) signals.

3. The method of claim 1, wherein the information includes ground clutter information.

4. The method of claim 1, wherein the information includes altitude-based information, time-of-day based information, or seasonal information.

5. The method of claim 1, wherein automatically adjusting includes:
   applying a threshold control law to adjust a threshold for a weather radar display associated with the weather radar system, adjusting a weather radar signal gain, or adjusting a tilt angle of a weather radar antenna.

6. A method of detecting weather for an aircraft using a weather radar system, the method comprising:
   determining a location of the aircraft;
   providing weather radar adjustment information associated with the location; and
   automatically adjusting the weather radar system in response to the weather radar adjustment information,
   wherein the information is stored in a land mass database.

7. A method of detecting weather for an aircraft using a weather radar system, the method comprising:
   determining a location of the aircraft;
   providing weather radar adjustment information associated with the location; and
   automatically adjusting the weather radar system in response to the weather radar adjustment information; and
   generating an assessment of whether the location is one of at least three types.

8. The method of claim 7, wherein the three types comprise:
   maritime, continental, and transitional.

9. A method of detecting weather for an aircraft using a weather radar system, the method comprising:
   determining a location of the aircraft;
   providing weather radar adjustment information associated with the location; and
   automatically adjusting the weather radar system in response to the weather radar adjustment information; and
   generating a weighting factor based on the location, the weighting factor being representative of whether the location is primarily maritime or primarily continental.

10. A method of adapting an aircraft weather radar system to a seasonal parameter, a time-of-day parameter, or a location parameter, the method comprising:
   determining the seasonal parameter, the time-of-day parameter, or the location parameter; and
   automatically adjusting the weather radar system to display weather in response to at least one of the seasonal parameter, time-of-day parameter, or location parameter.

11. The method of claim 10, wherein the location parameter is derived from global positioning system (GPS) signals.

12. The method of claim 10, wherein the location parameter for land mass information.

13. The method of claim 10, wherein the adjusting occurs in response to the location parameter and the seasonal parameter or the location parameter and the time-of-day parameter.

14. The method of claim 10, wherein the adjusting includes changing a tilt angle, a gain, or a threshold for a display.

15. The method of claim 10, further comprising:
   applying a threshold control law to adjust the weather radar system.

16. The method of claim 10, further comprising:
   generating an assessment of whether a location is one of at least three types.

17. The method of claim 16, wherein the three types comprise:
   maritime, continental, and transitional.

18. An airborne weather radar system carried on an aircraft, comprising:
   a radar antenna system; and
   a processing means for adjusting performance of the weather radar system based on at least one of:
   1. a location of the aircraft;
   2. a time-of-day; or
   3. a time-of-year.

19. The airborne weather radar of claim 18, wherein the processing means changes a display threshold for a weather radar display.

20. The airborne weather radar of claim 18, wherein the processing means adjusts the performance in response to the location, time-of-day, and a time-of-year.

21. A weather radar system for mounting to the aircraft and for detecting weather for an aircraft, the system comprising:
   means for determining a location of the aircraft;
   means for determining a geographic region or region type associated with the determined location;
   means for retrieving weather radar adjustment information previously associated with the geographic region or region type; and
   means for automatically adjusting the weather radar system in response to the weather radar adjustment information.

22. A weather radar system for mounting to an aircraft and for detecting weather for the aircraft, the aircraft including a location circuit determining and outputting an indication of a location of the aircraft, the system comprising:
   a database storing land mass information and weather radar adjustment information;
   an input receiving the indication of the location of the aircraft from the location circuit;
   a processor receiving the indication of the location of the aircraft from the input, the processor retrieving, from the database, weather radar adjustment information previously associated with the location, a location type corresponding with the location, or the location and the location type corresponding with the location;
   wherein the processor automatically adjusts the weather radar system in response to the retrieved weather radar adjustment information.

* * * * *